Jan. 28, 1936.                P. S. BEAR                2,029,150
                    CONDITION CONTROLLED MECHANISM
                       Filed Feb. 14, 1935        3 Sheets-Sheet 1
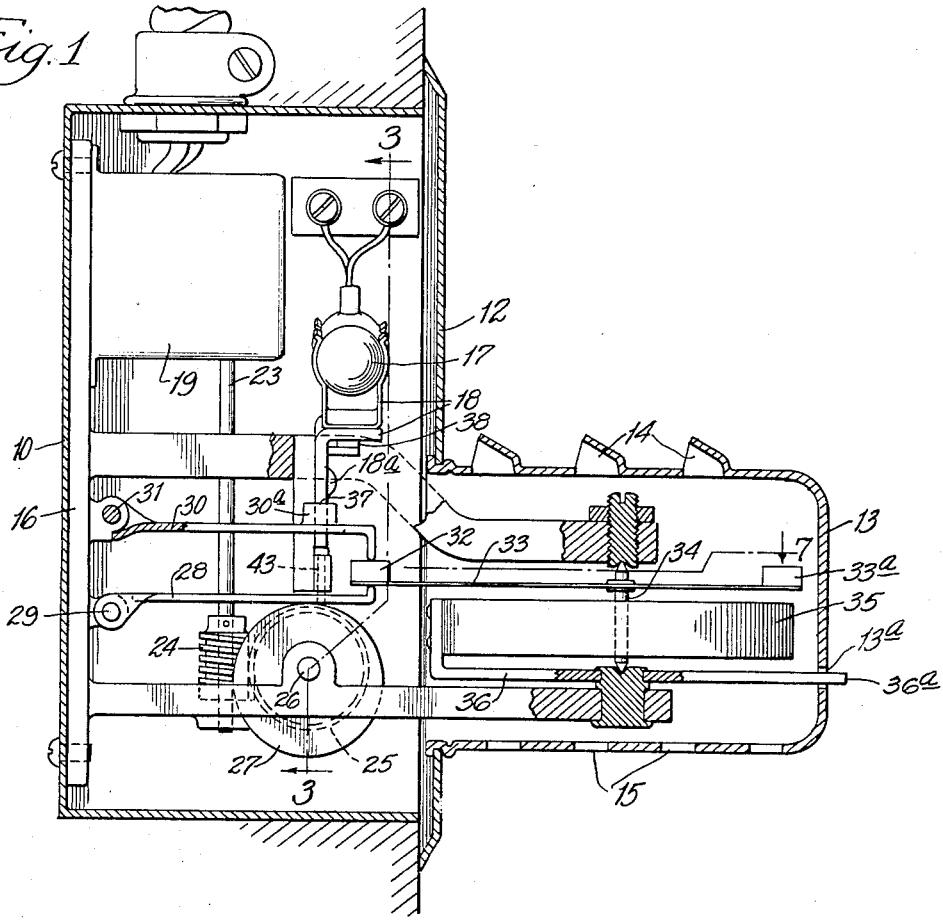
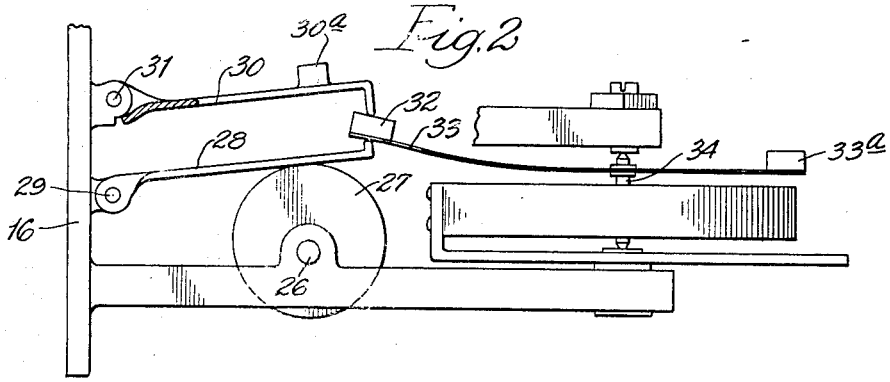
Inventor:
Paul S. Bear,
By Bunning & Bunning
Attys.

Jan. 28, 1936.  P. S. BEAR  2,029,150
CONDITION CONTROLLED MECHANISM
Filed Feb. 14, 1935   3 Sheets-Sheet 2
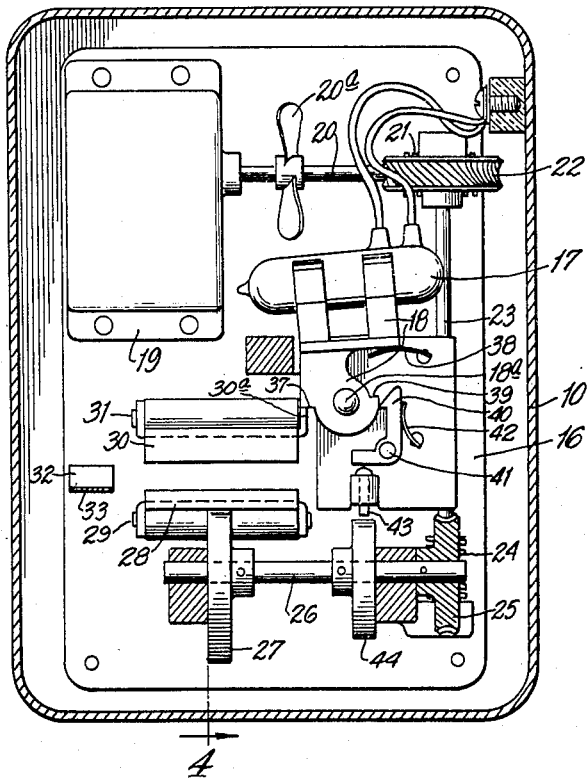
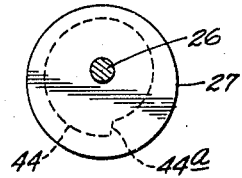
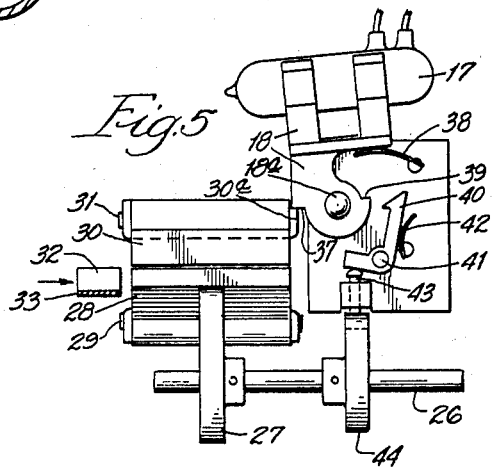
Inventor:
Paul S. Bear,
By Banning & Banning
Attys.

Jan. 28, 1936.  P. S. BEAR  2,029,150
CONDITION CONTROLLED MECHANISM
Filed Feb. 14, 1935  3 Sheets-Sheet 3
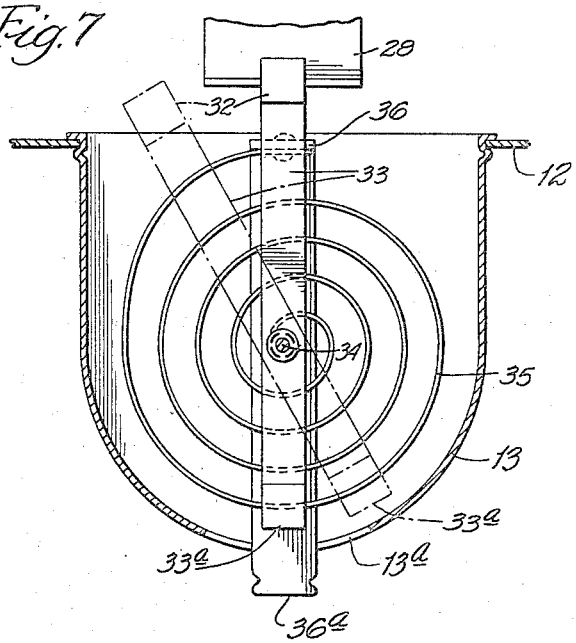
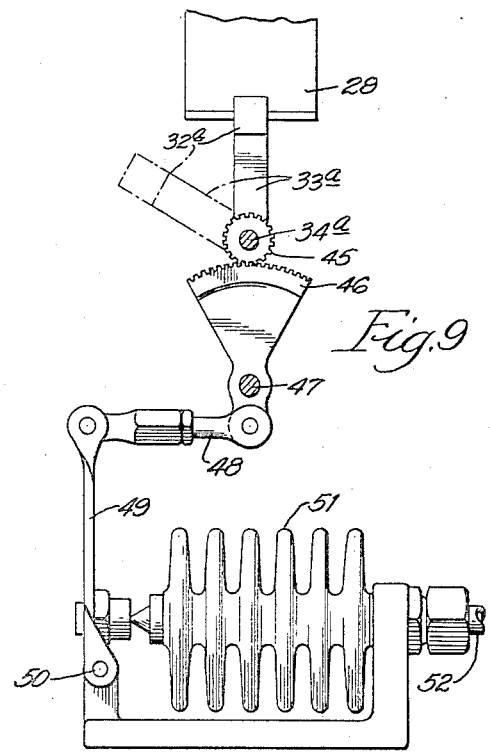
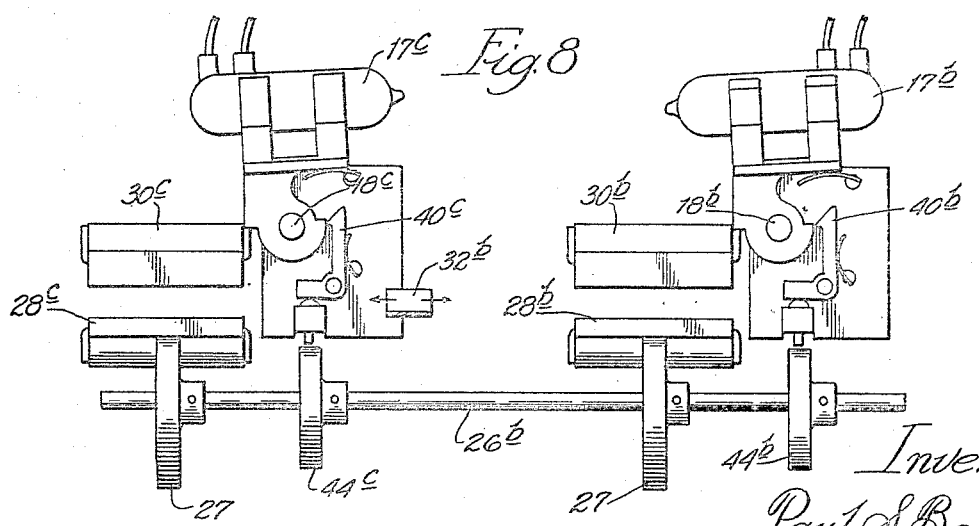
Inventor:
Paul S. Bear,
By Bunning & Bunning
Attys.

Patented Jan. 28, 1936

2,029,150

UNITED STATES PATENT OFFICE 2,029,150

CONDITION CONTROLLED MECHANISM

Paul S. Bear, Dowagiac, Mich., assignor of three-fourths to Herbert E. Bucklen, Jr., Elkhart, Ind.

Application February 14, 1935, Serial No. 6,601

15 Claims. (Cl. 74—53)

It is an object of this invention to provide a mechanism for utilizing a force or movement produced by a change in condition of an element, such as a thermostat, humidistat, pressure gage, voltmeter, ammeter, clock and the like, to transmit and multiply motion to a controlling means, such as a switch, valve, brake, variable resistance, and the like, for any desired purpose.

In the embodiment illustrated, this object is accomplished by means of a member forming part of the transmission movable into and out of operative position. Included in the transmission is a continuously operating driving member and a second member adapted to be driven thereby but only when the movable member is advanced to operative position as the result of a force exerted by the condition-controlled element. The driven member which is thus actuated performs a desired function, such as operating an electric switch, valve clutch, or other part, and holds it in a desired position so long as the movable member is operatively related to the driving and driven members.

In the mechanism here illustrated I have provided a constantly reciprocating or oscillating driving member which is movable toward and from a driven member but without transmitting motion thereto except when an operative connection therebetween is established by the movable member, in this case a block, which may advance into position between the driving and driven members so that motion is thereby transmitted to a part to be operated, an electric switch, for example.

An exemplification of my invention is shown in the accompanying drawings in the manner following:

Figure 1 is a vertical section through the apparatus in its entirety;

Fig. 2 is a partial similar section showing the driving and driven members in another position;

Fig. 3 is a vertical section on line 3—3 of Fig. 1;

Fig. 4 is a partial section on line 4 of Fig. 3 showing the operating and the release cams;

Fig. 5 is a partial section viewed on line 3—3 of Fig. 1 in which the operating members, including a switch, are substantially in an inoperative position;

Fig. 6 is a similar view showing the same parts in an operative position;

Fig. 7 is a partial horizontal section on line 7 of Fig. 1 showing, with the aid of dotted lines, two positions of the movable block forming part of the transmission;

Fig. 8 is a view similar to Fig. 3 showing two switches, each in connection with its own transmission, together with a single movable block which is responsive to changing conditions; and Fig. 9 is another form of condition operated mechanism for moving a block to operatively connect the reciprocating members.

The embodiment illustrated comprises a fixedly mounted housing 10 having a cover 12 secured thereover which carries an extension of the housing 13 which has a series of louvers 14 in the top and a series of holes 15 in the bottom for the free passage of air. A frame 16 secured within the casing supports a switch 17, here shown as of the mercury type, which is mounted on a rocker arm 18 for swinging about a pivot 18ª. This switch will not be shown in detail as it is well known, but it will be understood that when the switch is rocked to the left, as shown in Figs. 3 and 5, the mercury of the switch will occupy the left-hand end of the glass tube, thereby causing the switch to be open as the electrodes (not shown) are at the right-hand end of the tube. When, however, the switch is rocked to the right, as shown in Fig. 6, the mercury will be in the right-hand end of the tube, thereby making contact through the two electrodes of the switch, thus causing the switch to be closed.

Referring to Fig. 3, the electric motor 19 there shown is provided with a shaft 20 on which is mounted a fan blade 20ª for circulating air through the housing. On this shaft is also keyed a worm 21 which constantly drives a worm wheel 22 on a shaft 23 upon which is keyed a worm 24 in mesh with a worm wheel 25 on a shaft 26 whereon is a cam 27, these several shafts being suitably journaled. By means of these two gear reductions the shaft 26 may be slowly rotated. A cam follower 28 (Fig. 1) is hingedly mounted at 29 so as to reciprocate or oscillate about this pivot. This follower I will refer to as a driving member that is continuously operated. A similar reciprocating member 30 is mounted to oscillate about a pin 31. This latter member is the driven member elsewhere referred to herein. The amount of movement of the driving member is not sufficient to cause it to touch the driven member, so that so long as nothing is interposed therebetween, the driven member will remain inactive.

A block 32 is carried on an arm 33 whereon is a counterweight 33a mounted on a shaft 34 which is pivotally and adjustably mounted at its ends in suitable pivot bearings so as to be rotatable with very little friction. The shaft 34 is shown as connected at one end to a spiral thermostatic element 35, the opposite end of which is connected to an arm 36 which is preferably journaled concentrically with the shaft 34. One end 36a of the arm extends through a slotted opening 13a in the extension 13. The thermostatic element may be a bimetal strip which expands or contracts due to changes in temperature. With each such change the arm is moved back and forth, and in doing so will move the block 32 in between, or out from between, the driving and driven members, as shown in Fig. 6. When the block is advanced to a position between these members, it will transmit motion from one to the other and in so doing will itself be reciprocated along with the arm upon which it is carried, the arm being flexible in one direction for this purpose. Upon the driven member is a finger 30a arranged to engage a shoulder 37 on the support for the switch, thereby causing the switch to be rocked in a clockwise direction, as shown in Fig. 6. A leaf spring 38, or the like, tends to return the switch to its normally inoperative position, as shown in Fig. 5.

The switch support is also provided with a shoulder 39 which is adapted to be engaged by a pawl 40, pivotally mounted at 41, which is pressed toward the shoulder by means of a spring 42. A release for this pawl is provided, consisting of a pin 43 which is operated by means of a release cam 44 (Fig. 4) which has a relatively abrupt shoulder 44a, so that the pin 43 is withdrawn on each revolution of the cam 44 while the driven member is at or near its position of maximum upward movement. Thus so long as the block remains between the driving and driven members, the switch will be held in the position shown in Fig. 6, but as soon as the block is withdrawn therefrom, the cam 44 on its next revolution will move the pin 43 to release the pawl 40, thereby permitting the switch 17 to be rocked back to its normal inoperative position by the spring 38.

The block is carried by an arm which is flexible in one direction so as to be yieldable, as shown in Fig. 2, when in position between the driving and driven members. For convenience, these members are pivoted for oscillating but may, if desired, be mounted for linear reciprocations, for rotation, or for other forms of movement. The term "reciprocating" as used herein is accordingly intended to cover all such forms of motion. Likewise the block may be moved in any convenient way so as to bring it into motion transmitting position either by an oscillatory motion, by a straight linear translation, by rotation, etc., the present apparatus being illustrative only. It is to be further understood that any other desired form of apparatus may be used to move the block, expansion and contraction due to changes in temperature, pressure, etc., being suggestive as some of the physical forces that may be conveniently employed in this connection.

In Fig. 9 is shown a modified form of the apparatus in which a similar block 32a is mounted upon a flexible arm 33a, the arm being rotated about a shaft 34a by means of a gear 45 which meshes with a gear segment 46 which is adapted to oscillate about a shaft 47 suitably journaled, the gear segment 46 being pivotally connected through a link 48 with a lever 49 which is pivotally connected at 50, the lever 49 being operated by a sylphon bellows 51 which may be connected through a tube 52 to a source of gas or vapor pressure, or which may be closed and partially filled with a liquid which gives varying pressures in response to differences in temperature in a well known manner.

In Fig. 8 is shown still another modification of the device in which there are two mercury switches 17b, 17c, mounted to swing about pins 18b, 18c. The switch 17b and its operating parts are the same as shown in Fig. 6, and the switch 17c and its operating parts are the same except that the switch 17c is reversed, so that, as shown in Fig. 8, the switch 17b is normally open while the switch 17c is normally closed. The block 32b when moved to the right passes between the driving and driven members 28b and 30b which serve as previously described to tilt the switch 17b into closed position.

If the block 32b, however, moves to the left, it passes between the members 28c, 30c, thereby causing the associated parts to tilt the mercury switch 17c to the right, causing the switch to open. A retaining pawl 40c will hold it in this position so long as the block 32b remains between the members 28c, 30c. As soon, however, as the block again passes out from between these members the cam 44c on its next revolution causes the pawl 40c to be released.

Thus it will be seen that this latter apparatus causes the switch 17b to be closed when the block 32b moves to the right, while the switch 17c remains closed, and the switch 17c to be opened while the switch 17b remains open when the block 32b moves to a predetermined position at the left. By rearranging these switches in their oscillating holders various combinations of this arrangement may be provided so that either switch may be opened or closed as the operator may desire for a particular circuit by movement of the block 32b to either end.

It will be understood that the embodiment here shown is illustrative only and that the rocker arm 18 or even the driving member may actuate or move various forms of switches, valves, brakes, clutches and the like.

While I have shown and described but a few embodiments of my invention, it is to be understood that it is capable of many modifications. Changes, therefore, may be made in the construction and arrangements which do not depart from the spirit and scope of the invention as disclosed in the appended claims.

I claim:

1. In apparatus of the class described, a part to be moved, a constantly reciprocating member, a second member spaced therefrom and parallel thereto in all positions, the second member being operably connected to the part so as to move the part from one position to another as the second member is moved, and a condition-controlled element normally out of operative relation with both members and movable into operative relation connecting said members to transmit motion from the constantly reciprocating member to the second member to move the part.

2. In apparatus of the class described, a part to be moved, a constantly reciprocating member, a second member spaced therefrom, the second member being operably connected to the part so as to move the part from one position to another as the second member is moved, a condition-controlled element normally out of operative relation with both members and movable into operative relation connecting said members to transmit motion from the constantly reciprocating member to the second member to move the part, and means for holding the part in moved relation so long as the element is in a position operably connecting the members.

3. In apparatus of the class described, a part to be moved, a constantly reciprocating member, a second member spaced therefrom and parallel thereto in all positions and having substantially the same width, the second member being operably connected to the part so as to move the part from one position to another as the second member is moved, and a condition-controlled element movable into and out of position between said members to transmit motion from the constantly reciprocating member to the second member to move the part.

4. In apparatus of the class described, a part to be moved, a constantly reciprocating member, a second member spaced therefrom and parallel thereto in all positions and having substantially the same width, the second member being operably connected to the switch so as to move the part from one position to another as the second member is moved, and a condition-controlled element carried on a flexible arm and movable into and out of position between said members to transmit motion from the constantly reciprocating member to the second member to move said part.

5. In apparatus of the class described, a part to be moved, a constantly reciprocating member, a second member spaced therefrom and parallel thereto in all positions, the second member being operably connected to the part so as to move the part from one position to another as the second member is moved, a second part to be moved, a second pair of similarly spaced members, and a condition-controlled element normally out of operative relation with both members and movable in one direction into operative relation with the first pair of spaced members to transmit motion to the first-mentioned part and movable in the reverse direction into operative relation with the second pair of spaced members to transmit motion to the second part.

6. In apparatus of the class described, a part to be moved, a constantly reciprocating member, a second member spaced therefrom and parallel thereto in all positions, the second member being operably connected to the part so as to move the part from one position to another as the second member is moved, a second part to be moved, a second pair of spaced members, a condition-controlled element normally out of operative relation with both members and movable in one direction into operative relation with the first pair of spaced members to transmit motion to the first-mentioned part and movable in the reverse direction into operative relation with the second pair of spaced members to transmit motion to the second part, and means associated with each said part for holding it in moved position so long as the element operably connects the corresponding pair of members.

7. In apparatus of the class described, a part to be moved, a constantly reciprocating member, a second member spaced therefrom, the second member being operably connected to the part so as to move the part from one position to another as the second member is moved, a condition-controlled element normally out of operative relation with both members and movable into operative relation connecting said members to transmit motion from the constantly reciprocating member to the second member to move the part, a spring-pressed pawl for holding the part in moved position, and a constantly rotating cam for releasing the pawl.

8. In apparatus of the class described, a part to be moved, a constantly reciprocating member, a second member spaced therefrom, the second member being operably connected to the part so as to move the part from one position to another as the second member is moved, a condition-controlled element normally out of operative relation with both members and movable into operative relation connecting said members to transmit motion from the constantly reciprocating member to the second member to move the part, a constantly rotating shaft, a cam thereon for moving the reciprocating member, a spring-pressed pawl for holding the part in moved position, and means carried by the shaft for releasing the pawl on each revolution of the shaft.

9. In apparatus of the class described, a part to be moved, a constantly reciprocating member, a second member spaced therefrom, the second member being operably connected to the part so as to move the part from one position to another as the second member is moved, a condition-controlled element normally out of operative relation with both members and movable into operative relation connecting said members to transmit motion from the constantly reciprocating member to the second member to move the part, a constantly rotating shaft, a cam thereon for moving the reciprocating member, a spring-pressed pawl for holding the part in moved position, and a second cam carried by the shaft for releasing the pawl on each revolution of the shaft.

10. In apparatus of the class described, a part to be moved, a constantly reciprocating member, a second member spaced therefrom, the second member being operably connected to the part so as to move the part from one position to another as the second member is moved, a condition-controlled element normally out of operative relation with both members and movable into operative relation connecting said members to transmit motion from the constantly reciprocating member to the second member to move the part, a constantly rotating shaft, a cam thereon for moving the reciprocating member, a spring-pressed pawl for holding the part in moved position, and a second cam carried by the shaft for releasing the pawl on each revolution of the shaft, the second member holding the part in operative relation to the pawl until after release on each revolution of the shaft.

11. In apparatus of the class described, a part to be moved, a constantly reciprocating member, a second member spaced therefrom, the second member being operably connected to the part so as to move the part from one position to another as the second member is moved, a condition-controlled element normally out of operative relation with both members and movable into operative relation connecting said members to transmit motion from the constantly reciprocating member to the second member to move the part, means for holding the part in moved position, and a constantly rotating cam for releasing said means.

12. In apparatus for transmitting and multiplying movement, the combination with a part operating continuously in one plane through a fixed range of movement, of a second part normally stationary but adapted to be operated through a fixed range of movement by the continuously operating part in a plane parallel therewith, and condition-controlled means movable through a third plane from one position to another in one of which positions it receives no motion from the continuously operating part and in another position of which it receives therefrom motion which it transmits in full to the second part to produce operation thereof through a fixed range of movement.

13. In apparatus of the class described, a switch to be moved, a constantly reciprocating member operably connected to said switch, a second member spaced therefrom and mounted for movement in a plane parallel with the reciprocating member, and a condition-controlled element normally out of operative relation with both members and movable in a direction transversely of their planes of movement into the space between the members to transmit motion from the constantly reciprocating member to the second member to move the switch to operative position.

14. In apparatus for transmitting and multiplying movement, the combination with an element to be moved counter to a continuously exerted force, of a continuously operating part having a fixed range of movement, a second part adapted for movement counter to a continuously exerted force and in operative connection with the element, and condition-controlled means movable between the first and second parts wherein in any such position it transmits from the first to the second part an unvarying extent of movement, ceasing only when the condition-controlled means moves away from between the first and second parts.

15. In apparatus for transmitting and multiplying movement, the combination with an element to be moved from a first to a second position counter to a continuously exerted force, of condition-controlled means movable through a fixed path, and two parts one in operative connection with the element and the other in continuous operation and located opposite the first part, there being a space between the two parts defined by parallel surfaces on opposite sides of the movement path of the condition-controlled means whereby the latter on entering between such surfaces to any extent will transmit from the one part to the other and to the element an unvarying motion and on moving away from between such surfaces will permit the element to return to its initial position.

PAUL S. BEAR.